(12) United States Patent
Hashimoto et al.

(10) Patent No.: US 9,196,033 B2
(45) Date of Patent: Nov. 24, 2015

(54) INSPECTION SENSITIVITY EVALUATION METHOD

(71) Applicant: NuFlare Technology, Inc., Yokohama (JP)

(72) Inventors: Hideaki Hashimoto, Kanagawa (JP); Nobutaka Kikuiri, Kanagawa (JP)

(73) Assignee: NuFlare Technology, Inc., Yokohama (JP)

( * ) Notice: Subject to any disclaimer, the term of this patent is extended or adjusted under 35 U.S.C. 154(b) by 0 days.

(21) Appl. No.: 14/278,212

(22) Filed: May 15, 2014

(65) Prior Publication Data

US 2014/0348414 A1 Nov. 27, 2014

(30) Foreign Application Priority Data

May 22, 2013 (JP) .................................. 2013-107837

(51) Int. Cl.
*G06K 9/00* (2006.01)
*G06T 7/00* (2006.01)

(52) U.S. Cl.
CPC ....... *G06T 7/001* (2013.01); *G06T 2207/10061* (2013.01); *G06T 2207/30148* (2013.01)

(58) Field of Classification Search
CPC .................... G06T 7/001; G06T 2207/30148; G06T 7/0004
USPC .......................................... 382/144, 145, 149
See application file for complete search history.

(56) References Cited

U.S. PATENT DOCUMENTS

| 5,764,793 A | * | 6/1998 | Omae et al. | 382/149 |
| 2007/0064993 A1 | * | 3/2007 | Oaki et al. | 382/144 |
| 2008/0260234 A1 | * | 10/2008 | Yamashita | 382/144 |
| 2009/0214104 A1 | * | 8/2009 | Sugihara | 382/145 |

FOREIGN PATENT DOCUMENTS

| JP | 3824542 | 9/2006 |
| JP | 4507549 | 7/2010 |

OTHER PUBLICATIONS

U.S. Appl. No. 14/607,483, filed Jan. 28, 2015, Kikuri.

* cited by examiner

*Primary Examiner* — Ruiping Li
(74) *Attorney, Agent, or Firm* — Oblon, McClelland, Maier & Neustadt, L.L.P.

(57) ABSTRACT

An inspection sensitivity evaluation method includes generating a reference design image where plural figure patterns are arranged, based on reference design data, generating plural position shift design images whose positional deviation amounts are mutually different such that positions of the plural figure patterns in the reference design image are uniformly shifted, acquiring an optical image of a photo mask fabricated based on the reference design data where there is no positional deviation from the plural figure patterns, calculating a first positional deviation amount between the reference design image and the optical image, calculating plural second positional deviation amounts each of which is a respective positional deviation amount between a corresponding position shift design image of the plural position shift design images and the optical image, and acquiring a detectable positional deviation amount by using the first and the plural second positional deviation amounts.

15 Claims, 9 Drawing Sheets

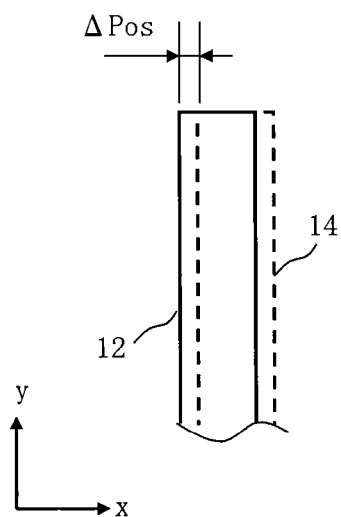
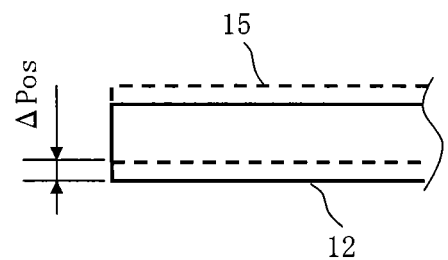
FIG. 9A  FIG. 9B
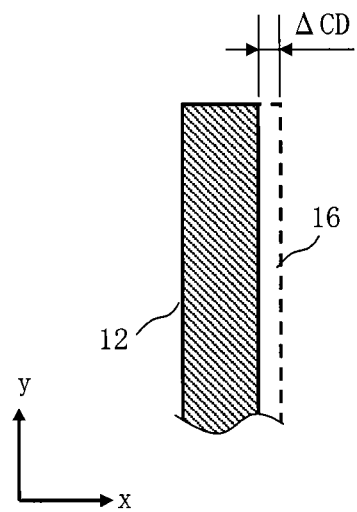
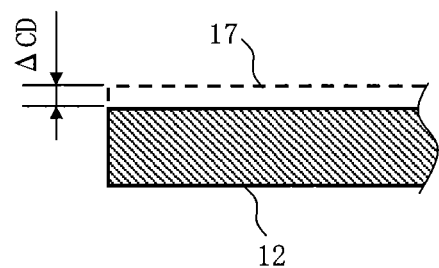
FIG. 10A  FIG. 10B

INSPECTION SENSITIVITY EVALUATION METHOD

CROSS-REFERENCE TO RELATED APPLICATION

This application is based upon and claims the benefit of priority from the prior Japanese Patent Application No. 2013-107837 filed on May 22, 2013 in Japan, the entire contents of which are incorporated herein by reference.

BACKGROUND OF THE INVENTION

1. Field of the Invention

The present invention relates to an inspection sensitivity evaluation method. More specifically, for example, it relates to an inspection sensitivity evaluation method of an inspection apparatus that inspects a pattern by irradiating laser lights or electron beams so as to acquire an optical image of the pattern to be inspected.

2. Description of Related Art

In recent years, with the advance of high integration and large capacity of a large scale integrated circuit (LSI), the line width (critical dimension) required for circuits of semiconductor elements is becoming progressively narrower. Such semiconductor elements are manufactured by exposing and transferring a pattern onto a wafer to form a circuit by means of a reduced projection exposure apparatus known as a stepper while using an original or "master" pattern (also called a mask or a reticle, and hereinafter generically referred to as a mask) with a circuit pattern formed thereon. Then, in fabricating a mask used for transferring such a fine circuit pattern onto a wafer, a pattern writing apparatus capable of writing or "drawing" fine circuit patterns by using electron beams needs to be employed. Pattern circuits may be written directly on the wafer by the pattern writing apparatus. Also, a laser beam writing apparatus that uses laser beams in place of electron beams for writing a pattern is under development.

Since LSI manufacturing requires a tremendous amount of manufacturing cost, it is crucial to improve its yield. However, as typified by a 1-gigabit DRAM (Dynamic Random Access Memory), the scale of a pattern configuring an LSI has been changing from an order of submicrons to an order of nanometers. One of major factors that decrease the yield of the LSI manufacturing is a pattern defect of a mask used when exposing and transferring a fine pattern onto a semiconductor wafer by the photolithography technology. In recent years, with miniaturization of dimensions of an LSI pattern formed on a semiconductor wafer, dimensions to be detected as a pattern defect have become extremely small. Thus, a pattern inspection apparatus which inspects a defect of a transfer mask used in manufacturing LSI needs to be highly precise.

As an inspection method, there is known a method of comparing an optical image of a pattern, formed on a target object or "sample", such as a lithography mask, imaged at a predetermined magnification by using a magnifying optical system with design data or an optical image obtained by imaging the same pattern on the target object. For example, the following is known as pattern inspection methods: the "die-to-die inspection" method that compares data of optical images of identical patterns at different positions on the same mask; and the "die-to-database inspection" method that inputs, into the inspection apparatus, writing data (design pattern data) which is generated by converting pattern-designed CAD data to a writing apparatus specific format for input when writing a pattern on the mask, generates design image data (reference image) based on the input writing data, and compares the generated design image data with an optical image (serving as measurement data) obtained by imaging the pattern. According to the inspection method for use in such an inspection apparatus, a target object is placed on the stage so that a light flux may scan the object by the movement of the stage in order to perform an inspection. Specifically, the target object is irradiated with a light flux from the light source and the illumination optical system. Light transmitted through the target object or reflected therefrom is focused on a sensor through the optical system. An image captured by the sensor is transmitted as measurement data to the comparison circuit. In the comparison circuit, after performing position alignment of images, measurement data and reference data are compared with each other in accordance with an appropriate algorithm. If there is no matching between the compared data, it is determined that a pattern defect is present.

In pattern inspection, it is also required to measure a critical dimension (CD) deviation of a pattern and a positional deviation of a pattern in addition to inspecting a pattern defect (shape defect). Conventionally, a dedicated measuring device is used for measuring a critical dimension (CD) deviation of a pattern or a positional deviation of a pattern. If these deviations can be simultaneously measured when performing a pattern defect inspection, it will be a great advantage in cost wise and inspection time wise. Therefore, the inspection apparatus is increasingly requested to have such a measurement function. With regard to measurement of a CD deviation, there is proposed an inspection method in which a pattern line width (critical dimension) in an image obtained for each preset region is measured, a difference from design data is calculated, and an average of all the CD differences in a region is compared with a threshold value, so that a line width abnormal region is found as a CD error (measurement defect) (refer to, e.g., Japanese Patent No. 3824542).

For realizing the measurement of a CD deviation and a positional deviation by an inspection apparatus, it is necessary to measure deviation of a pattern formed on the real mask with respect to mask design data. Meanwhile, precision of a CD deviation amount or a positional deviation amount measured by the inspection apparatus is verified by comparison with data measured by a dedicated measuring device. With the current trend of miniaturization of patterns, precision (level) of several nanometers is required as the precision of CD deviation or positional deviation. Thus, similarly, the level of several nanometers is also required for inspection sensitivity (measurement sensitivity) of the inspection apparatus. Therefore, in order to evaluate the inspection sensitivity of the inspection apparatus, it is needed to fabricate a real mask for evaluation where CDs and positions are shifted, for example, by about 1/10 of the specification value, such as by 0.1 to 0.2 nm. However, there is a problem that to practically fabricate a real mask on which patterns are formed with the CDs and positions shifted at such precision is difficult.

That is, there exists a problem of difficulty in practically fabricating a real mask where patterns are formed in a manner such that CDs and positions are shifted with the precision required for inspection sensitivity of the inspection apparatus in connection with recent miniaturization trend of patterns. Accordingly, for realizing measurement of a CD deviation and a positional deviation by an inspection apparatus, there is a problem that to evaluate inspection sensitivity of the apparatus is difficult.

BRIEF SUMMARY OF THE INVENTION

In accordance with one aspect of the present invention, an inspection sensitivity evaluation method includes generating a reference design image in which a plurality of figure patterns are arranged, based on reference design data in which the plurality of figure patterns are defined, generating a plurality of position shift design images whose positional deviation amounts are different from each other based on a plurality of preset positional deviation amounts in a manner such that positions of the plurality of figure patterns in the reference design image are uniformly shifted with respect to the plurality of figure patterns defined in the reference design data, acquiring an optical image of a photo mask fabricated based on the reference design data where there is no positional deviation with respect to the plurality of figure patterns, calculating a first positional deviation amount between the reference design image and the optical image, calculating a plurality of second positional deviation amounts each of which is a respective positional deviation amount between a corresponding position shift design image of the plurality of position shift design images and the optical image, and acquiring a detectable positional deviation amount by using the first positional deviation amount and the plurality of second positional deviation amounts.

Moreover, in accordance with another aspect of the present invention, an inspection sensitivity evaluation method includes generating a reference design image in which a plurality of figure patterns are arranged, based on reference design data in which the plurality of figure patterns are defined, generating a plurality of dimension shift design images whose critical dimension deviation amounts are different from each other based on a plurality of preset critical dimension deviation amounts in a manner such that critical dimensions of the plurality of figure patterns in the reference design image are uniformly shifted with respect to the plurality of figure patterns defined in the reference design data, acquiring an optical image of a photo mask fabricated based on the reference design data where there is no critical dimension deviation with respect to the plurality of figure patterns, calculating a first critical dimension deviation amount between the reference design image and the optical image, calculating a plurality of second critical dimension deviation amounts each of which is a respective critical dimension deviation amount between a corresponding dimension shift design image of the plurality of dimension shift design images and the optical image, and acquiring a detectable critical dimension deviation amount by using the first critical dimension deviation amount and the plurality of second critical dimension deviation amounts.

Furthermore, in accordance with another aspect of the present invention, an inspection sensitivity evaluation method includes generating a plurality of reference design images in which a respective plurality of figure patterns are arranged, based on reference design data in which the respective plurality of figure patterns are defined in a plurality of quadrangular regions whose positions are different from each other, to be corresponding to the plurality of quadrangular regions, generating a respective plurality of position shift design images whose positional deviation amounts are different from each other based on a plurality of preset positional deviation amounts in a manner such that positions of the respective plurality of figure patterns in a corresponding reference design image of the plurality of reference design images are uniformly shifted with respect to the respective plurality of figure patterns defined in the reference design data, to be corresponding to each of the plurality of quadrangular regions whose positions are different from each other, generating a respective plurality of dimension shift design images whose critical dimension deviation amounts are different from each other based on a plurality of preset critical dimension deviation amounts in a manner such that critical dimensions of the respective plurality of figure patterns in a corresponding reference design image of the plurality of reference design images are uniformly shifted with respect to the respective plurality of figure patterns defined in the reference design data, to be corresponding to the plurality of quadrangular regions whose positions are different from each other, acquiring an optical image for each of a plurality of stripe regions obtained by virtually dividing an inspection region of a photo mask into a plurality of strip-shaped inspection regions by a size of one side of one of the plurality of quadrangular regions, wherein the photo mask is fabricated based on the reference design data in which the respective plurality of figure patterns are defined in the plurality of regions, dividing the optical image for the each of the plurality of stripe regions into a plurality of frame images by a size of another side of the one of the quadrangular regions, calculating, for each frame image of the plurality of frame images, a first positional deviation amount between a frame image concerned and a corresponding reference design image by performing position alignment between the each frame image and a corresponding reference design image of the plurality of reference design images, calculating, for the each frame image of the plurality of frame images, a plurality of second positional deviation amounts each of which is a respective positional deviation amount between a frame image concerned and a corresponding position shift design image by performing position alignment between the each frame image and a corresponding position shift design image of the plurality of position shift design images, calculating, for the each frame image, a plurality of positional deviation difference values by respectively subtracting the first positional deviation amount from the plurality of second positional deviation amount, calculating, for the each frame image, a first critical dimension deviation amount between the each frame image of the plurality of frame images and a corresponding reference design image of the plurality of reference design images, calculating, for the each frame image, a plurality of second critical dimension deviation amounts each of which is a respective critical dimension deviation amount between the each frame image of the plurality of frame images and a corresponding dimension shift design image of the plurality of dimension shift design images, calculating, for the each frame image, a plurality of critical dimension difference values by respectively subtracting the first critical dimension deviation amount from the plurality of second critical dimension deviation amount, acquiring a detectable positional deviation amount by using the plurality of positional deviation difference values, and acquiring a detectable critical dimension deviation amount by using the plurality of critical dimension difference values.

BRIEF DESCRIPTION OF THE DRAWINGS

FIGS. 9A and 9B show examples of a positional deviation amount according to the first embodiment; and FIGS. 10A and 10B show examples of ΔCD according to the first embodiment.

DETAILED DESCRIPTION OF THE INVENTION

First Embodiment

In Embodiments, there is described an inspection sensitivity evaluation method that can evaluate whether it is possible to detect a CD deviation or a positional deviation shifted at required precision.

With regard to precision required for inspection sensitivity of an inspection apparatus, it is difficult to fabricate a real mask where patterns for evaluation are formed in a manner such that CDs and positions are shifted at the precision (several nanometers), such as each 0.1 to 0.2 nm. According to the first embodiment, conversely to what is described above, there is prepared "shift design pattern data" in which line widths (CDs) and positions are shifted with respect to design pattern data. Then, a mask fabricated based on a reference design pattern in which CD dimensions and positions are not shifted is used as a real mask.

Figure 1:
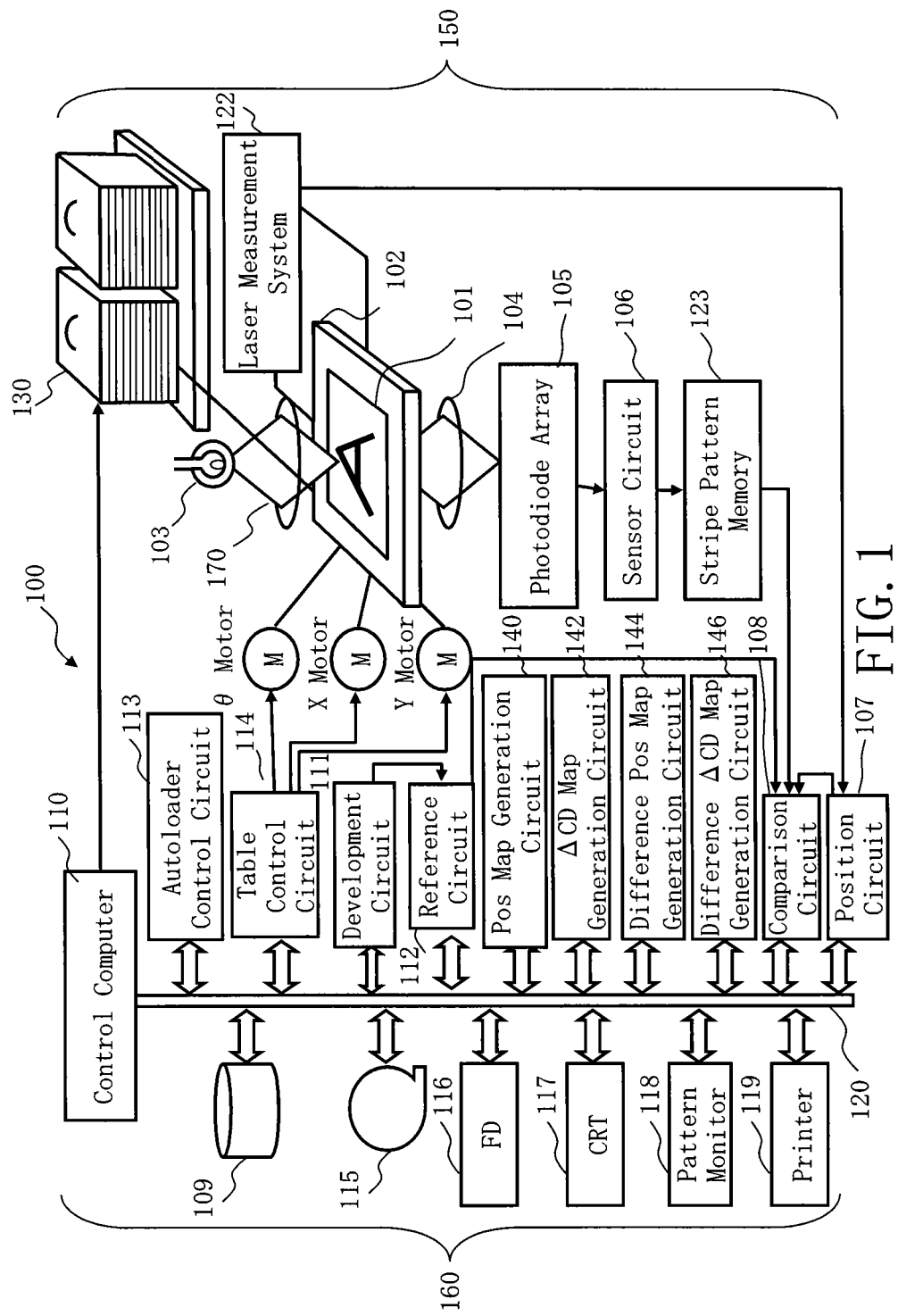
FIG. 1 shows a configuration of a pattern inspection apparatus according to a first embodiment.

FIG. 1 shows the configuration of a pattern inspection apparatus according to the first embodiment. In FIG. 1, an inspection apparatus 100 that inspects defects of patterns formed on a target object such as a mask includes an optical image acquisition unit 150 and a control system circuit 160 (control unit).

The optical image acquisition unit 150 includes a light source 103, an illumination optical system 170, an XYθ table 102 arranged movably, a magnifying optical system 104, a photodiode array 105 (an example of a sensor), a sensor circuit 106, a stripe pattern memory 123, and a laser measurement system 122. A target object 101 is placed on the XYθ table 102. The target object 101 is, for example, an exposure photo mask used for transferring a pattern to a wafer. A pattern composed of a plurality of figures to be inspected is formed on the photo mask. In this case, an evaluation pattern for evaluating a critical dimension (CD) deviation (ΔCD) of a pattern and/or a positional deviation of a pattern is formed on the photo mask. The target object 101 is placed on the XYθ table 102 with its pattern formation side facing down, for example.

In the control system circuit 160, a control computer 110 is connected, through a bus 120, to a position circuit 107, a comparison circuit 108, a development circuit 111, a reference circuit 112, an autoloader control circuit 113, a table control circuit 114, a positional deviation map (Pos map) generation circuit 140, a CD deviation (ΔCD) map generation circuit 142, a difference Pos map generation circuit 144, a difference ΔCD map generation circuit 146, a magnetic disk drive 109, a magnetic tape drive 115, a flexible disk unit (FD) 116, a CRT 117, a pattern monitor 118, and a printer 119. Moreover, the sensor circuit 106 is connected to the stripe pattern memory 123 which is connected to the comparison circuit 108. The XYθ table 102 is driven by an X-axis motor, a Y-axis motor, and a θ-axis motor. The XYθ table 102 serves as an example of the stage.

In the inspection apparatus 100, an inspection optical system of large magnification is composed of the light source 103, the XYθ table 102, the illumination optical system 170, the magnifying optical system 104, the photodiode array 105, and the sensor circuit 106. The XYθ table 102 is driven by the table control circuit 114 under the control of the control computer 110. The XYθ table 102 can be moved by a drive system such as a three-axis (X, Y, and θ) motor, which drives in the directions of x, y, and θ. For example, a step motor can be used as each of these X, Y, and θ motors. The XYθ table 102 is movable in the horizontal direction and a rotation direction by the X-, Y-, and θ-axis motors. The moving position of the XYθ table 102 is measured by the laser measurement system 122 and supplied to the position circuit 107.

FIG. 1 shows a configuration necessary for describing the first embodiment. It should be understood that other configuration elements generally necessary for the inspection apparatus 100 may also be included therein.

Figure 2:
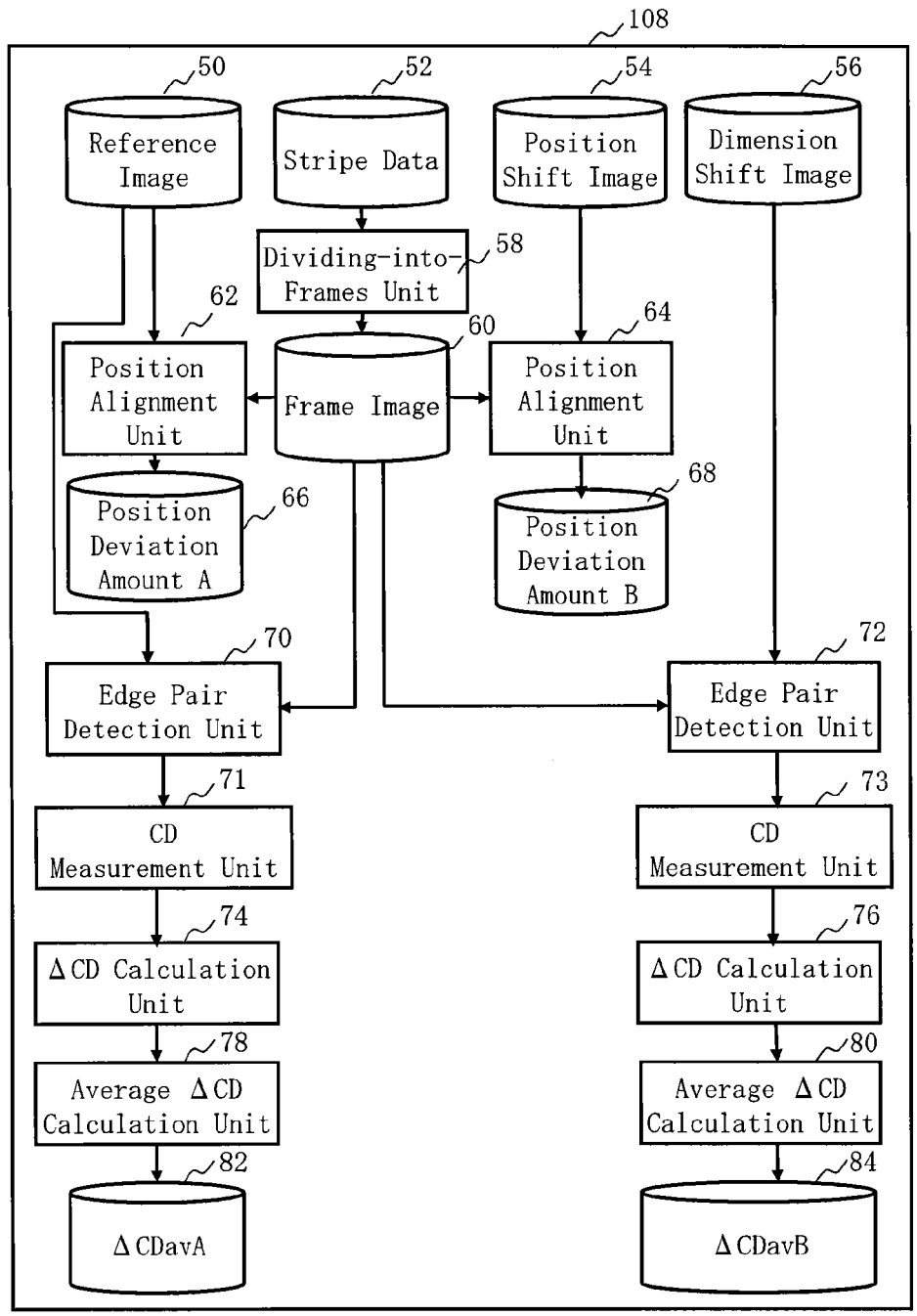
FIG. 2 shows an internal configuration of a comparison circuit according to the first embodiment.

FIG. 2 shows an internal configuration of the comparison circuit according to the first embodiment. In FIG. 2, in the comparison circuit 108, there are arranged memories 50, 52, 54, 56, 60, 66, 68, 82, and 84, a dividing-into-frames unit 58, position alignment units 62 and 64, edge pair detection units 70 and 72, CD measurement units 71 and 73, ΔCD calculation units 74 and 76, and average ΔCD calculation units 78 and 80. Each function, such as the dividing-into-frames unit 58, the position alignment units 62 and 64, the edge pair detection units 70 and 72, the CD measurement units 71 and 73, the ΔCD calculation units 74 and 76, and the average ΔCD calculation units 78 and 80, may be configured by software such as a program causing a computer to implement these functions or by hardware such as an electronic circuit. Alternatively, it may be configured by a combination of hardware and software. Input data required in the comparison circuit 108 or a calculated result is stored in a memory (not shown) each time.

Figure 3:
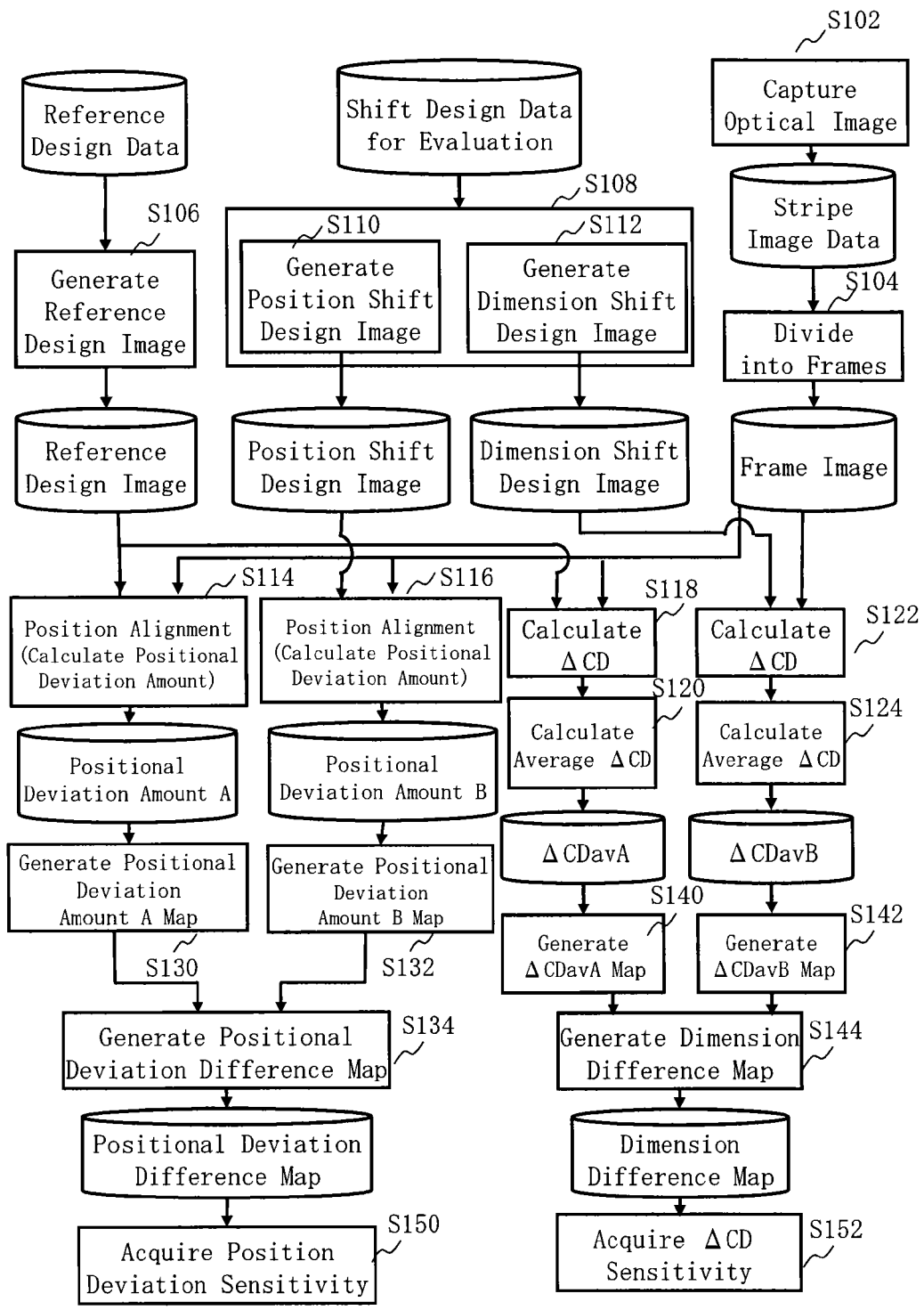
FIG. 3 is a flowchart showing main steps of an inspection sensitivity evaluation method according to the first embodiment.

FIG. 3 is a flowchart showing main steps of an inspection sensitivity evaluation method according to the first embodiment. In FIG. 3, the inspection sensitivity evaluation method according to the first embodiment executes a series of steps: an optical image capturing step (S102), a dividing-into-frames step (S104), a reference design image generation step (S106), a shift design image generation step (S108), a position alignment step (S114), a position alignment step (S116), a ΔCD calculation step (S118), an average ΔCD calculation step (S120), a ΔCD calculation step (S122), an average ΔCD calculation step (S124), a positional deviation amount A map generation step (S130), a positional deviation amount B map generation step (S132), a positional deviation difference map generation step (S134), an average ΔCD (ΔCDav) A map generation step (S140), an average ΔCD (ΔCDav) B map generation step (S142), a dimension difference map generation step (S144), a positional deviation sensitivity acquisition step (S150), and a ΔCD sensitivity acquisition step (S152). Moreover, the shift design image generation step (S108) executes, as internal steps, a position shift design image generation step (S110) and a dimension shift design image generation step (S112).

In the optical image capturing step (S102) (also called a scanning step or an optical image acquisition step), the optical image acquisition unit 150 acquires an optical image of a photo mask serving as the target object 101, which is fabricated based on reference design data where there is no positional deviation from a desired position with respect to each of a plurality of figure patterns and there is no critical dimension deviation from a desired critical dimension with respect to a plurality of figure patterns. In other words, the target object 101 is fabricated based on reference design data in which no positional deviation processing and no dimension deviation processing are deliberately performed. Specifically, it operates as follows.

Patterns formed on the target object 101 are irradiated by a laser light (e.g., a DUV light) being an inspection light of a wavelength of or below the ultraviolet region emitted from the suitable light source 103 through the illumination optical system 170. Light transmitted through the target object 101 is focused as an optical image on the photodiode array 105 (an example of a sensor) via the magnifying optical system 104, and enters thereinto. It is preferable to use, for example, a TDI (Time Delay Integration) sensor and the like as the photodiode array 105.

Figure 4:
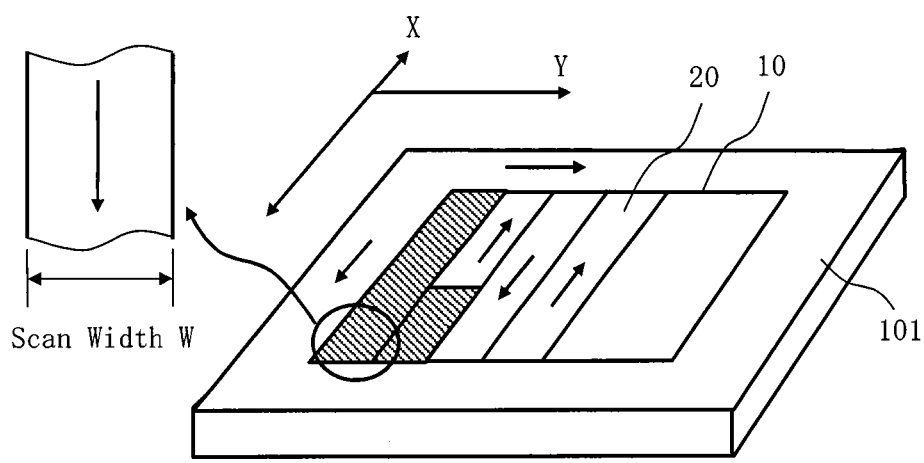
FIG. 4 is a conceptual diagram illustrating an inspection region according to the first embodiment.

FIG. 4 is a conceptual diagram illustrating an inspection region according to the first embodiment. As shown in FIG. 4, an inspection region 10 (entire inspection region) of the target object 101 is virtually divided into a plurality of strip-shaped inspection stripes 20 each having a scan width W in the y direction, for example. In the inspection apparatus 100, an image (strip region image) is acquired for each inspection stripe 20. Then, with respect to each of the inspection stripes 20, an image of a figure pattern arranged in a stripe region concerned is captured using a laser light, in the longitudinal direction (the x direction) of the stripe region concerned. Optical images are acquired by the photodiode array 105 which moves relatively in the x direction continuously by the movement of the XYθ table 102. That is, the photodiode array 105 continuously captures optical images each having a scan width W as shown in FIG. 4. In other words, the photodiode array 105, being an example of a sensor, captures optical images of patterns formed on the target object 101 by using an inspection light, while moving relatively to the XYθ table 102 (stage). According to the first embodiment, after capturing an optical image in one inspection stripe 20, the photodiode array 105 moves in the y direction to the position of the next inspection stripe 20 and similarly captures another optical image having the scan width W continuously while moving in the direction reverse to the last image capturing direction. Thereby, the image capturing is repeated in the forward (FWD) to backward (BWD) direction, namely going in the reverse direction when advancing and returning.

The direction of the image capturing is not limited to repeating the forward (FWD) and backward (BWD) movement. It is also acceptable to capture an image from a fixed one direction. For example, repeating FWD and FWD may be sufficient, and alternatively, BWD and BWD may also be sufficient.

A pattern image focused on the photodiode array 105 is photoelectrically converted by each light receiving element of the photodiode array 105, and is further analog-to-digital (A/D) converted by the sensor circuit 106. Then, pixel data for each inspection stripe 20 is stored in the stripe pattern memory 123. When capturing an image of pixel data (stripe region image), a dynamic range whose maximum gray level is the case of 100% of an incident illumination light quantity, for example, is used as the dynamic range of the photodiode array 105. Then, the stripe region image is sent to the comparison circuit 108 with data indicating the position of the photo mask 101 on the XYθ table 102 output from the position circuit 107. Measurement data (pixel data) is 8-bit unsigned data, for example, and indicates a gray level (light intensity) of brightness of each pixel. The stripe region image input into the comparison circuit 108 is stored in the memory 52.

Figure 5:
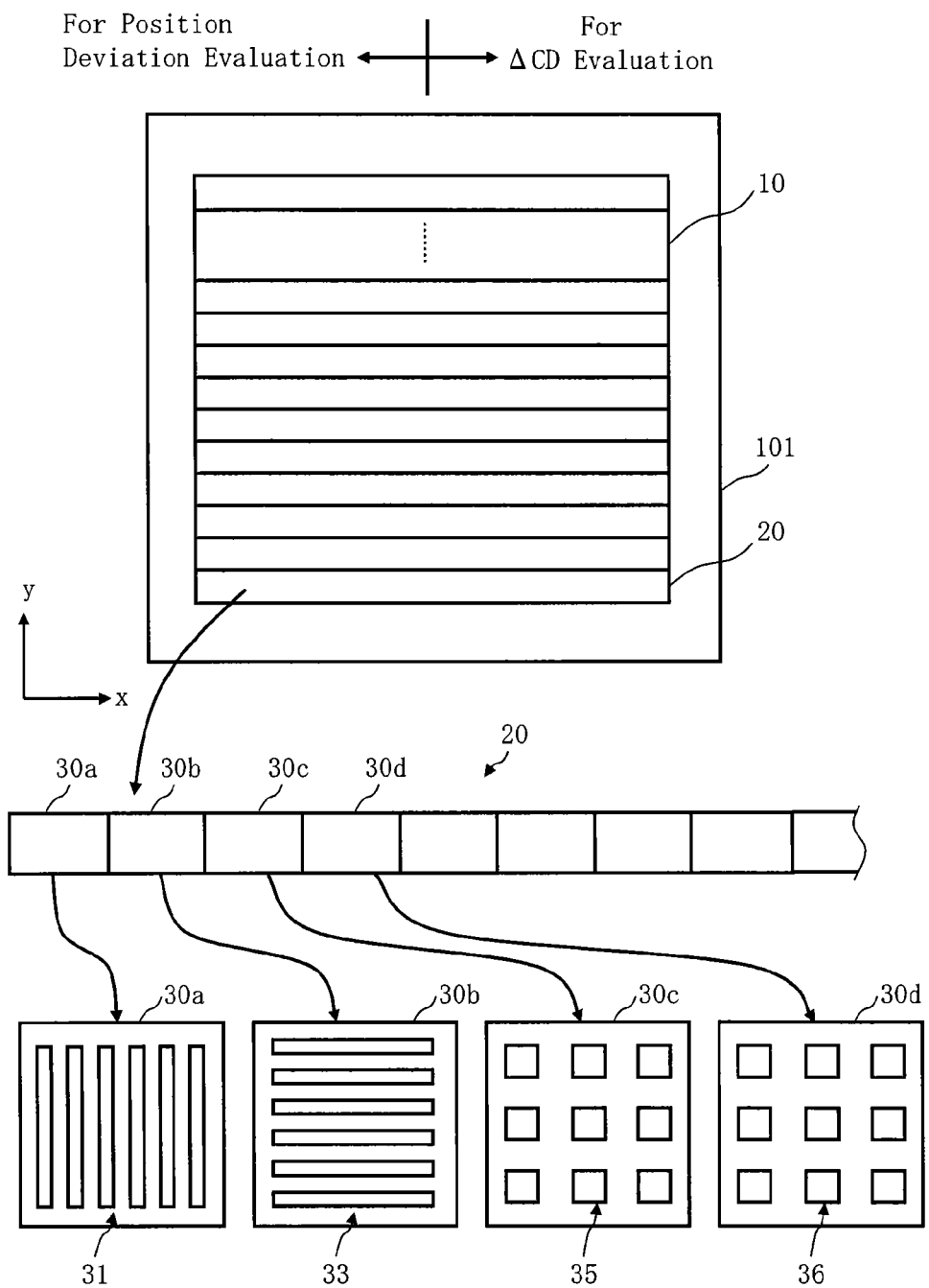
FIG. 5 shows an example of an evaluation pattern formed on a photo mask according to the first embodiment.

FIG. 5 shows an example of an evaluation pattern formed on the photo mask according to the first embodiment. As described above, a strip region image (an optical image) is acquired for each of a plurality of inspection stripes 20 (stripe regions) which are obtained by virtually dividing the inspection region 10 of the photo mask being the target object 101 into a plurality of strip-shaped stripes. Moreover, as to be described later, a stripe region image is divided in the x direction into a plurality of frame images by the width the same as that of the inspection stripe 20, for example, a scan width W. Thus, the inspection region 10 is virtually divided into a plurality of frame regions 30 each being the frame image size. In other words, the inspection region 10 of the photo mask is virtually divided into a plurality of strip-shaped inspection stripes 20 by the size of one side (size in the y direction) of the frame region 30, and each of the inspection stripes 20 is virtually divided into a plurality of frame regions 30 by the size of the other side (size in the x direction) of the frame region 30. In reference design data, a plurality of figure patterns are defined as evaluation patterns in each of a plurality of frame regions 30 (quadrangular regions) each having the frame image size. As a plurality of figure patterns described above, the following patterns are defined, for example. Line and space patterns 31 arranged at a predetermined width and pitch in the x direction are defined, for the x direction evaluation, in a frame region 30a, for example. Line and space patterns 33 arranged at a predetermined width and pitch in the y direction are defined, for the y direction evaluation, in a frame region 30b, for example. A plurality of quadrangular patterns 35 arranged at a predetermined width and pitch in the x and y directions are defined, for the x direction evaluation, in a frame region 30c, for example. A plurality of quadrangular patterns 36 arranged at a predetermined width and pitch in the x and y directions similarly to the frame region 30c are defined, for the y direction evaluation, in a frame region 30d, for example.

In each frame region 30 in each inspection stripe 20, the line and space patterns 31 in the x direction, the line and space patterns 33 in the y direction, a plurality of quadrangular patterns 35, or a plurality of quadrangular patterns 36 are repeatedly defined. Here, for example, the left half of the inspection region 10 of the target object 101 is used for evaluation of positional deviation inspection sensitivity, and the right half is used for evaluation of ΔCD inspection sensitivity. Therefore, in each inspection stripe 20, it is preferable that the line and space patterns 31 in the x direction, the line and space patterns 33 in the y direction, a plurality of quadrangular patterns 35, and a plurality of quadrangular patterns 36 are at least once defined in the left half of a plurality of frame regions 30, and the line and space patterns 31 in the x direction, the line and space patterns 33 in the y direction, a plurality of quadrangular patterns 35, and a plurality of quadrangular patterns 36 are at least once defined in the right half of a plurality of frame regions 30. Thus, a plurality of figure patterns for evaluation are defined in each of a plurality of frame regions 30 in each inspection stripe 20.

A mask fabricated based on the reference design data in which a plurality of figure patterns for evaluation are defined in each of a plurality of frame regions 30 is used as the photo mask being the target object 101.

In the dividing-into-frames step (S104), for each inspection stripe 20, the dividing-into-frames unit 58 divides, in the x direction, a stripe region image (an optical image) into a plurality of frame images (optical images) by a predetermined size (for example, by the same width as the scan width W). For example, it is divided into frame regions each having 512×512 pixels. In other words, the stripe region image of each inspection stripe 20 is divided into a plurality of frame images (optical images) by the width the same as that of the inspection stripe 20, for example, by the scan width W. A plurality of frame images (optical images) corresponding to a plurality of frame regions 30 are acquired by this processing. A plurality of frame images are stored in the memory 60.

Then, the reference design data, in which a plurality of figure patterns for evaluation are defined in each of a plurality of frame regions 30 whose positions are different from each other, is stored in the magnetic disk drive 109. According to the first embodiment, further, there is generated and stored position shift design data, in which a plurality of position shift patterns, having different positional deviation amounts, based on a plurality of preset position shift amounts (positional deviation amounts) are defined in a manner such that positions of a plurality of figure patterns in a frame image (frame region) are uniformly shifted with respect to a plurality of figure patterns defined in the reference design data. As to an amount difference between a plurality of position shift amounts, it is preferable that the difference is what is difficult to produce in a real mask.

Moreover, there is generated and stored dimension shift design data, in which a plurality of dimension shift patterns, having different CD dimension deviation amounts, based on a plurality of preset dimension shift amounts (critical dimension deviation amounts) are defined in a manner such that CD dimensions of a plurality of figure patterns in a frame image (frame region) are uniformly shifted with respect to a plurality of figure patterns defined in the reference design data. As to an amount difference between a plurality of dimension shift amounts, it is preferable that the difference is what is difficult to produce in a real mask. It is also preferable that the position shift design data and the dimension shift design data are collected to be one shift design data.

Figure 6:
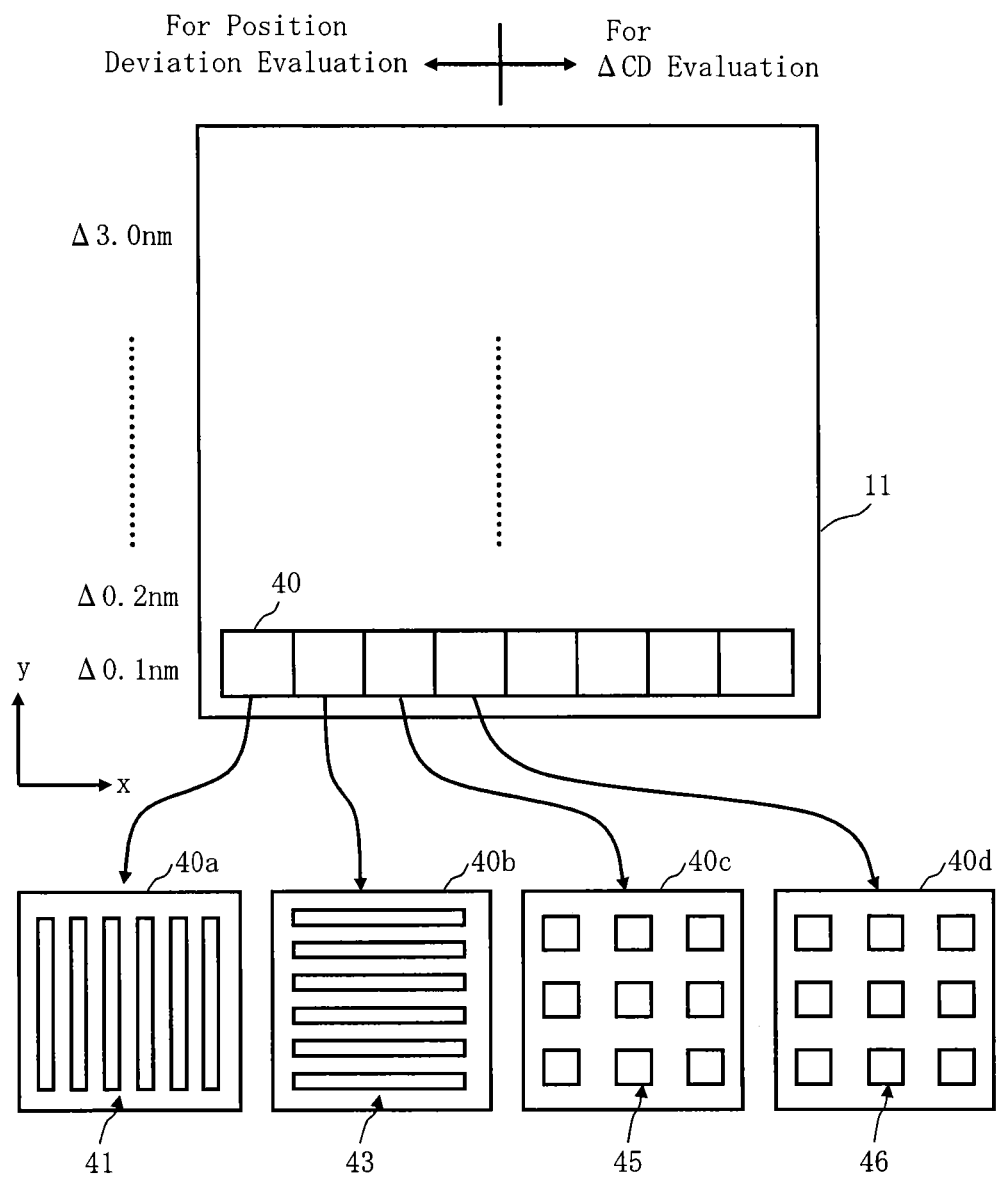
FIG. 6 shows an example of a pattern of shift design data according to the first embodiment.

FIG. 6 shows an example of a pattern of shift design data according to the first embodiment. In FIG. 6, a position shift pattern for evaluation of positional deviation is defined at the position of the frame region 40 in the left half of an inspection region 11 corresponding to the inspection region 10 of the photo mask, for example. A dimension shift pattern for evaluation of CD deviation is defined at the position of the frame region 40 in the right half of the inspection region 11. In a first frame region 40a of a plurality of frame regions 40 in the left half of the region corresponding to the first inspection stripe of a real mask, there are defined line and space patterns 41 arranged in the x direction in a manner such that the line and space patterns 31 in the x direction in FIG. 5 are uniformly shifted, for example, by 0.1 nm in the x direction for the frame region 40a. Similarly, in a second frame region 40b, there are defined line and space patterns 43 arranged in the y direction in a manner such that the line and space patterns 33 in the y direction in FIG. 5 are uniformly shifted, for example, by 0.1 nm in the y direction for the frame region 40b. Similarly, in a third frame region 40c, there are defined a plurality of quadrangular patterns 45 arranged in a manner such that a plurality of quadrangular patterns 35 in FIG. 5 are uniformly shifted, for example, by 0.1 nm in the x direction for the frame region 40c. Similarly, in a fourth frame region 40d, there are defined a plurality of quadrangular patterns 46 arranged in a manner such that a plurality of quadrangular patterns 36 in FIG. 5 are uniformly shifted, for example, by 0.1 nm in the y direction for the frame region 40d. In remaining frame regions 40 of a plurality of frame regions 40 in the left half of the inspection region 11, what is needed is to therein define in order the position shift patterns defined in the frame regions 40a to 40d.

Moreover, in the first frame region 40a of a plurality of frame regions 40 in the right half of the region corresponding to the first inspection stripe of the real mask, there are defined line and space patterns 41 arranged in the x direction in a manner such that the line width (CD) of the line and space patterns 31 in the x direction in FIG. 5 are uniformly enlarged, for example, by 0.1 nm in the x direction for the frame region 40a. Similarly, in the second frame region 40b, there are defined line and space patterns 43 arranged in the y direction in a manner such that the line width (CD) of the line and space patterns 33 in the y direction in FIG. 5 are uniformly enlarged, for example, by 0.1 nm in the y direction for the frame region 40b. Similarly, in the third frame region 40c, there are defined a plurality of quadrangular patterns 45 arranged in a manner such that the line width (CD) of a plurality of quadrangular patterns 35 in FIG. 5 are uniformly enlarged, for example, by 0.1 nm in the x direction for the frame region 40c. Similarly, in the fourth frame region 40d, there are defined a plurality of quadrangular patterns 46 arranged in a manner such that the line width (CD) of a plurality of quadrangular patterns 36 in FIG. 5 are uniformly enlarged, for example, by 0.1 nm in the y direction for the frame region 40d. In remaining frame regions 40 of a plurality of frame regions 40 in the right half of the inspection region 11, what is needed is to therein define in order the dimension shift patterns defined in the frame regions 40a to 40d.

In a plurality of frame regions 40 in the left half of the region corresponding to the second inspection stripe of the real mask, patterns are defined in a manner such that the patterns in each frame region 40 of the first inspection stripe are shifted by a position shift amount of 0.2 nm. In a plurality of frame regions 40 in the right half of the region, patterns are defined in a manner such that the patterns in each frame region 40 of the first inspection stripe are shifted by a dimension shift amount of 0.2 nm.

In a plurality of frame regions 40 in the left half of the region corresponding to the third inspection stripe of the real mask, patterns are defined in a manner such that the patterns in each frame region 40 of the first inspection stripe are shifted by a position shift amount of 0.3 nm. In a plurality of frame regions 40 in the right half of the region, patterns are defined in a manner such that the patterns in each frame region 40 of the first inspection stripe are shifted by a dimension shift amount of 0.3 nm.

In a plurality of frame regions 40 in the left half of the region corresponding to the fourth inspection stripe of the real mask, patterns are defined in a manner such that the patterns in each frame region 40 of the first inspection stripe are shifted by a position shift amount of 0.4 nm. In a plurality of frame regions 40 in the right half of the region, patterns are defined in a manner such that the patterns in each frame region 40 of the first inspection stripe are shifted by a dimension shift amount of 0.4 nm.

Hereinafter, the position shift amount and the dimension shift amount are similarly increased in order. For example, in a plurality of frame regions 40 in the left half of the region corresponding to the 30th inspection stripe of the real mask, patterns are defined in a manner such that the patterns in each frame region 40 of the first inspection stripe are shifted by a position shift amount of 3.0 nm. In a plurality of frame regions 40 in the right half of the region, patterns are defined in a manner such that the patterns in each frame region 40 of the first inspection stripe are shifted by a dimension shift amount of 3.0 nm.

In the reference design image generation step (S106), a reference design image in which a plurality of figure patterns are arranged, is generated based on reference design data in which a plurality of figure patterns are defined. Here, a plurality of reference design images corresponding to a plurality of frame regions 30 are generated. Specifically, it operates as follows. First, the development circuit 111 reads reference design data from the magnetic disk drive 109 through the control computer 110, converts each figure pattern of each frame region defined in the read reference design data into image data of binary values or multiple values, and sends the image data to the reference circuit 112.

Figures defined in the reference design data are, for example, rectangles or triangles as basic figures. For example, figure data that defines the shape, size, position, and the like of each pattern is stored as information, such as coordinates (x, y) at a reference position of a figure, the length of a side, the figure code being an identifier for identifying a figure type, such as a rectangle or a triangle. Now, the figure of the evaluation pattern mentioned above is defined.

When information on the reference design pattern used as figure data is input to the development circuit 111, the data is developed into data of each figure. Then, a figure code, figure dimensions and the like indicating the figure shape of the figure data are interpreted. Then, reference design image data of binary values or multiple values is developed and output as a pattern arranged in a grid which is a unit of a predetermined quantization size grid. In other words, reference design data is loaded, and an occupancy rate of a figure in a reference design pattern is calculated for each grid obtained by virtually dividing an inspection region into grids of a predetermined dimensions. Then, occupancy rate data of n bits is output. For example, it is preferable that one grid is set as one pixel. When a resolution of $1/2^8$ (=1/256) is given to one pixel, a small region of 1/256 is allocated to the region of a figure arranged in a pixel to calculate an occupancy rate in the pixel. Then, it is output as occupancy rate data of 8 bits to the reference circuit 112.

Next, the reference circuit 112 performs appropriate filter processing on reference design image data being the sent image data of a figure.

Figure 7:
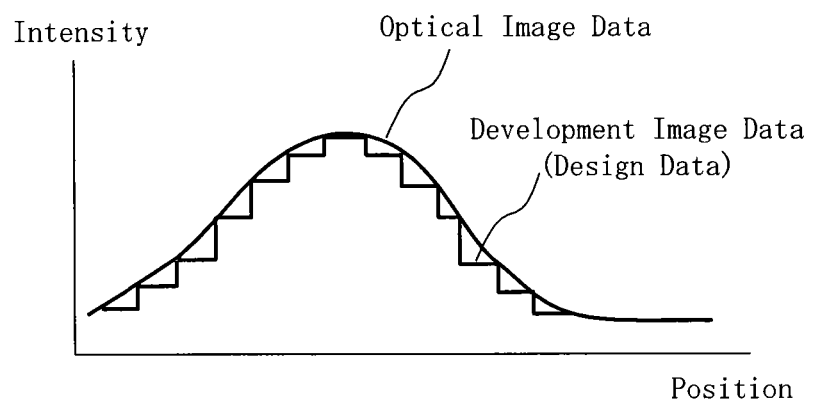
FIG. 7 shows filter processing according to the first embodiment.

FIG. 7 shows filter processing according to the first embodiment. Since measurement data as an optical image obtained from the sensor circuit 106 is in a state in which a filter is activated by a resolution characteristic of the magnifying optical system 104, an aperture effect of the photodiode array 105, or the like, in other words, in an analog state in which data changes continuously, it is possible to match with measurement data by also performing filter processing on reference design image data being design side image data whose image intensity (gray value) is a digital value. In this way, a reference design image (reference image) to be compared with a frame image (optical image) is generated. The generated reference design image is output to the comparison circuit 108 to be stored in the memory 50.

As described above, a plurality of reference design images of a plurality of figure patterns corresponding to a plurality of frame regions 30 are generated based on reference design data in which a plurality of figure patterns are defined for each of a plurality of frame regions 30 whose positions are different from each other. Thereby, a plurality of reference design images corresponding to a plurality of frame images of each inspection stripe 20 imaged from the target object 101 are generated.

In the sift design image generation step (S108), first, the development circuit 111 reads shift design data from the magnetic disk drive 109 through the control computer 110, converts each figure pattern of each frame region defined in the read shift design data into image data of binary values or multiple values, and sends the image data to the reference circuit 112. The reference circuit 112 performs appropriate filter processing on the shift design image data being the sent image data of a figure. The contents of the processing are the same as those in the case of generating a reference design image.

In the processing, as the position shift design image generation step (S110), a plurality of position shift design images having different positional deviation amounts are generated based on a plurality of preset position shift amounts in a manner such that positions of a plurality of figure patterns in the reference design image are uniformly shifted with respect to a plurality of figure patterns defined in reference design data, for each of the plurality of reference design images corresponding to the plurality of frame regions 30. A plurality of position shift design images are generated as images of each of a plurality of frame regions having different positions. As to a difference of a position shift amount between a plurality of position shift design images, it is preferable that the difference is what is difficult to produce in a real mask.

Similarly, in the processing, as the dimension shift design image generation step (S112), a plurality of dimension shift design images having different critical dimension deviation amounts are generated based on a plurality of preset dimension shift amounts in a manner such that critical dimensions of a plurality of figure patterns in an image are uniformly shifted with respect to a plurality of figure patterns defined in reference design data. A plurality of dimension shift design images are generated as images of each of a plurality of frame regions having different positions. As to a difference of a dimension shift amount between a plurality of dimension shift design images, it is preferable that the difference is what is difficult to produce in a real mask.

In the position alignment step (S114), the position alignment unit 62 performs position alignment between each frame image of a plurality of frame images and each corresponding reference design image of a plurality of reference design images, and calculates a reference positional deviation amount (first positional deviation amount) between a frame image concerned and a corresponding reference design image, for each frame image (frame region). The position alignment is performed moving the entire frame region. It is preferable, for example, that the position alignment is performed by the unit of a sub-pixel, using a least-squares method, etc. Thereby, a positional deviation error in generating a photo mask based on reference design data can be perceived. Moreover, a reference position deviation error depending on the position of the frame region 30 can be perceived. Since, according to the first embodiment, the left half of each of the inspection regions 10 and 11 is used for evaluation of positional deviation, a reference positional deviation amount should be calculated for each frame region in the left half of each of the inspection regions 10 and 11. The calculated reference positional deviation amount (positional deviation amount A) of each frame region is stored in the memory 66.

As to a reference positional deviation amount, it is sufficient to obtain just a positional deviation amount in the x direction with respect to a frame region of the x-direction line and space pattern 31, for example. It is sufficient to obtain just a positional deviation amount in the y direction with respect to a frame region of the y-direction line and space pattern 33, for example. With respect to a frame region of a plurality of quadrangular patterns 35, it is sufficient to obtain just a positional deviation amount in the x direction. With respect to a frame region of a plurality of quadrangular patterns 36, it is sufficient to obtain just a positional deviation amount in the y direction.

In the position alignment step (S116), the position alignment unit 64 performs position alignment between each frame image of a plurality of frame images and each corresponding position shift design image of a plurality of position shift design images, and calculates a positional deviation amount (second positional deviation amount) between a frame image concerned and a corresponding position shift design image, for each frame image (frame region).

Figure 8:
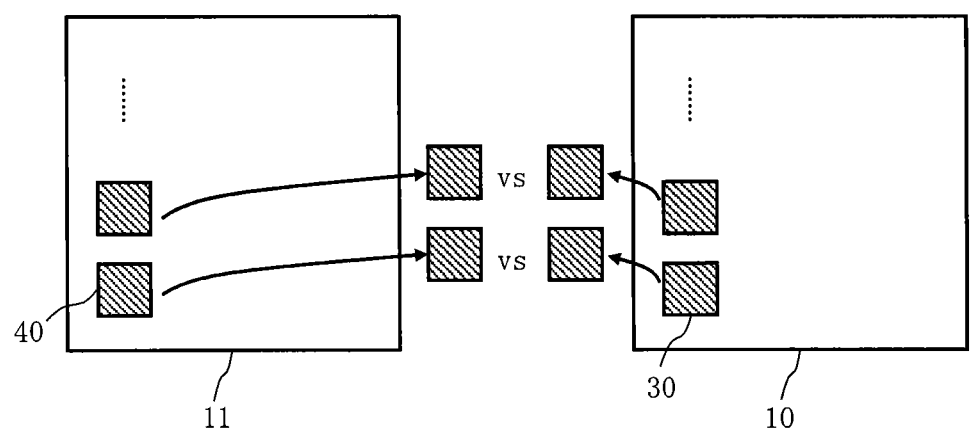
FIG. 8 is for illustrating corresponding frame regions according to the first embodiment.

FIG. 8 is for illustrating corresponding frame regions according to the first embodiment. As to a frame image of the target object 101 used as a real mask and a position shift design image, position alignment is performed between the frame regions 30 and 40 at the same positions in order to calculate a positional deviation amount (second positional deviation amount). Thereby, it is unnecessary to specially perform processing on the corresponding relation between the frame regions 30 and 40, and therefore, the conventional inspection apparatus 100 can be used as it is.

FIGS. 9A and 9B show examples of a positional deviation amount according to the first embodiment. FIG. 9A shows an example of a positional deviation amount ΔPos which is generated when performing position alignment in the x direction between, for example, a pattern 12 in a frame image obtained from the target object 101 serving as a real mask and a pattern 14 in a position shift design image. FIG. 9B shows an example of a positional deviation amount ΔPos which is generated when performing position alignment in the y direction between, for example, the pattern 12 in a frame image obtained from the target object 101 serving as a real mask and a pattern 15 in a position shift design image. Although only one figure is shown in each of the examples of FIGS. 9A and 9B, position alignment is performed uniformly moving the entire frame region, using a frame image obtained from the target object 101 being a real mask and a position shift design image. It is preferable, for example, that the position alignment is performed by the unit of a sub pixel, using a least-squares method etc. Thereby, a positional deviation amount corresponding to a position shift amount can be obtained. Moreover, with respect to a line pattern and a quadrangular pattern, a positional deviation amount corresponding to a position shift amount in the x direction and a positional deviation amount corresponding to a position shift amount in the y direction can be obtained. Since, according to the first embodiment, the left half of each of the inspection regions 10 and 11 is used for evaluation of positional deviation, a positional deviation amount should be calculated for each frame region in the left half of each of the inspection regions 10 and 11. Then, the calculated positional deviation amount (positional deviation amount B) of each frame region is stored in the memory 68.

As to a positional deviation amount, it is sufficient to obtain just a positional deviation amount in the x direction with respect to a frame region of the x-direction line and space pattern 41, for example. It is sufficient to obtain just a positional deviation amount in the y direction with respect to a frame region of the y-direction line and space pattern 43, for example. With respect to a frame region of a plurality of quadrangular patterns 45, it is sufficient to obtain just a positional deviation amount in the x direction. With respect to a frame region of a plurality of quadrangular patterns 46, it is sufficient to obtain just a positional deviation amount in the y direction.

In the ΔCD calculation step (S118), a CD deviation amount (ΔCD) between each pattern in a frame image and a corresponding pattern in a corresponding reference design image in a plurality of reference design images is calculated for each frame image (frame region). Specifically, processing is performed as follows.

First, for each frame image (frame region), the edge pair detection unit 70 recognizes the position of the edge part (perimeter) of a pattern in a corresponding reference design image, and detects an edge part in a frame image forming a pair with the pattern edge part of the reference design image. An edge pair composed of the edges of both the ends (both the perimeters) configuring a CD of a pattern is detected, for example, per pixel. For example, with respect to a frame region of the x-direction line and space pattern 31, a pair is detected in each pixel on the perimeter of a line pattern extending in the y direction. For example, with respect to a frame region of the y-direction line and space pattern 33, a pair is detected in each pixel on the perimeter of a line pattern extending in the x direction. With respect to a frame region of a plurality of quadrangular patterns 35, a pair is detected in each pixel on the perimeter of each quadrangular pattern 35 extending in the y direction. With respect to a frame region of a plurality of quadrangular patterns 36, a pair is detected in each pixel on the perimeter of each quadrangular pattern 36 extending in the x direction.

It is also preferable to detect, in each frame region, an edge pair of a CD in a space part (white part) between adjacent patterns as well as a CD in a black part where a pattern exists.

Next, the CD measurement unit 71 measures, for each frame region, a critical dimension (CD) of a plurality of figure patterns in a frame image (optical image) of a frame region concerned. A critical dimension is measured for an edge pair detected per pixel.

Next, the ΔCD calculation unit 74 calculates, for each frame region, each critical dimension deviation ΔCD (a critical dimension difference) of critical dimensions of a plurality of figure patterns in a frame image of a frame region concerned against critical dimensions of a plurality of figure patterns in a reference design image corresponding to the frame region concerned. For example, with respect to a frame region of the x-direction line and space pattern 31, a reference ΔCD in the x direction is calculated for each edge pair. For example, with respect to a frame region of the y-direction line and space pattern 33, a reference ΔCD in the y direction is calculated for each edge pair. With respect to a frame region of a plurality of quadrangular patterns 35, a reference ΔCD in the x direction is calculated for each edge pair. With respect to a frame region of a plurality of quadrangular patterns 36, a reference ΔCD in the y direction is calculated for each edge pair.

In the average ΔCD calculation step (S120), the average ΔCD calculation unit 78 calculates, for each frame region, an average value (average ΔCD) of each critical dimension deviation ΔCD (a critical dimension difference) of a plurality of figure patterns in a frame image. For example, with respect to a frame region of the x-direction line and space pattern 31, all the reference ΔCDs in the x direction are added to calculate an average value. With respect to a frame region of the y-direction line and space pattern 33, all the reference ΔCDs in the y direction are added to calculate an average value. With respect to a frame region of a plurality of quadrangular patterns 35, all the reference ΔCDs in the x direction are added to calculate an average value. With respect to a frame region of a plurality of quadrangular patterns 36, all the reference ΔCDs in the y direction are added to calculate an average value. In this way, a reference average ΔCD (ΔCDavA) of each frame region is calculated. Errors can be reduced by averaging ΔCDs in a frame region.

That is, for each frame image (frame region), a reference CD deviation amount (average ΔCD (ΔCDavA): the first critical dimension deviation amount) is calculated between each frame image of a plurality of frame images and a corresponding reference design image of a plurality of reference design images. The calculated ΔCDavA of each frame region is stored in the memory 82.

In the ΔCD calculation step (S122), for each frame image (frame region), a CD deviation amount (ΔCD) is calculated between each pattern in a frame image and a corresponding pattern in a corresponding dimension shift design image in a plurality of dimension shift design images. Similarly to the case of FIG. 8, ΔCD between the frame regions 30 and 40 at the same positions is calculated with respect to a frame image of the target object 101 used as a real mask and a dimension shift design image. Thereby, it is unnecessary to specially perform processing on the corresponding relation between the frame regions 30 and 40, and therefore, the conventional inspection apparatus 100 can be used as it is. Specifically, processing is performed as follows.

First, for each frame image (frame region), the edge pair detection unit 72 recognizes the position of the edge part (perimeter) of a pattern in a corresponding dimension shift design image, and detects an edge part in a frame image forming a pair with the pattern edge part of the dimension shift design image. An edge pair composed of the edges of both the ends (both the perimeters) configuring a CD of a pattern is detected, for example, per pixel. For example, with respect to a frame region of the x-direction line and space pattern 41, a pair is detected in each pixel on the perimeter of a line pattern extending in the y direction. For example, with respect to a frame region of the y-direction line and space pattern 43, a pair is detected in each pixel on the perimeter of a line pattern extending in the x direction. With respect to a frame region of a plurality of quadrangular patterns 45, a pair is detected in each pixel on the perimeter of each quadrangular pattern 45 extending in the y direction. With respect to a frame region of a plurality of quadrangular patterns 46, a pair is detected in each pixel on the perimeter of each quadrangular pattern 46 extending in the x direction. An edge pair for each dimension shift amount is detected.

Similarly to what is described above, it is also preferable to detect, in each frame region, an edge pair of a CD in a space part (white part) between adjacent patterns as well as a CD in a black part where a pattern exists.

Next, the CD measurement unit 73 measures, for each frame region, a critical dimension (CD) of a plurality of figure patterns in a frame image (optical image) of a frame region concerned. A critical dimension is measured for an edge pair detected per pixel.

Next, the ΔCD calculation unit 76 calculates, for each frame region, each critical dimension deviation ΔCD (a critical dimension difference) of critical dimensions of a plurality of figure patterns in a frame image of a frame region concerned against critical dimensions of a plurality of figure patterns in a dimension shift design image corresponding to the frame region concerned.

FIGS. 10A and 10B show examples of ΔCD according to the first embodiment. FIG. 10A shows an example of ΔCD in the x direction between the pattern 12 in a frame image obtained from the target object 101 serving as a real mask and a pattern 16 in a dimension shift design image. FIG. 10B shows an example of ΔCD in the y direction between the pattern 12 in a frame image obtained from the target object 101 serving as a real mask and a pattern 17 in a dimension shift design image.

For example, with respect to a frame region of the x-direction line and space pattern 41, a ΔCD in the x direction is calculated for each edge pair. For example, with respect to a frame region of the y-direction line and space pattern 43, a ΔCD in the y direction is calculated for each edge pair. With respect to a frame region of a plurality of quadrangular patterns 45, a ΔCD in the x direction is calculated for each edge pair. With respect to a frame region of a plurality of quadrangular patterns 46, a ΔCD in the y direction is calculated for each edge pair. A ΔCD is similarly calculated for each of frame regions having different dimension shift amounts each other.

In the average ΔCD calculation step (S124), the average ΔCD calculation unit 80 calculates, for each frame region, an average value (an average ΔCD) of each critical dimension deviation ΔCD (a critical dimension difference) of a plurality of figure patterns in a frame image. For example, with respect to a frame region of the x-direction line and space pattern 41, all the ΔCDs in the x direction are added to calculate an average value. With respect to a frame region of the y-direction line and space pattern 43, all the ΔCDs in the y direction are added to calculate an average value. With respect to a frame region of a plurality of quadrangular patterns 45, all the ΔCDs in the x direction are added to calculate an average value. With respect to a frame region of a plurality of quadrangular patterns 46, all the ΔCDs in the y direction are added to calculate an average value. In this way, an average ΔCD (ΔCDavB) of each frame region is calculated. Errors can be reduced by averaging ΔCDs in a frame region. A residual can be reduced by equalizing ΔCDs in the frame regions in which dimension shifting has been uniformly performed.

That is, for each frame image (frame region), a CD deviation amount (an average ΔCD (ΔCDavB): the second critical dimension deviation amount) is calculated between each frame image of a plurality of frame images and a corresponding dimension shift design image of a plurality of dimension shift design images where the dimension shift amount is variable. The calculated ΔCDavB of each frame region is stored in the memory 84.

In the positional deviation amount A map generation step (S130), the Pos map generation circuit 140 loads a reference positional deviation amount (a positional deviation amount A) for each frame region from the memory 66, and generates a positional deviation amount A map of the entire region of at least the left half of the inspection region, where each reference positional deviation amount is a map value. The positional deviation amount A map is output, for example, to the magnetic disk drive 109, the magnetic tape drive 115, the FD 116, the CRT 117, the pattern monitor 118, or the printer 119. Alternatively, it may be output to the outside of the apparatus.

In the positional deviation amount B map generation step (S132), the Pos map generation circuit 140 loads a positional deviation amount (a positional deviation amount B) for each frame region from the memory 68, and generates a positional deviation amount B map of the entire region of at least the left half of the inspection region, where each positional deviation amount is a map value. The positional deviation amount B map is output, for example, to the magnetic disk drive 109, the magnetic tape drive 115, the FD 116, the CRT 117, the pattern monitor 118, or the printer 119. Alternatively, it may be output to the outside of the apparatus.

In the positional deviation difference map generation step (S134), the difference Pos map generation circuit 144 calculates, for each frame image (frame region), a positional deviation difference value by subtracting a positional deviation amount A (the first positional deviation amount) from a positional deviation amount B (the second positional deviation amount). Thereby, it is possible to eliminate a positional deviation error amount generated when generating a photo mask from reference design data. Then, a positional deviation difference map of the entire region of at least the left half of the inspection region is generated, where each positional deviation difference value is a map value. The positional deviation difference map is output, for example, to the magnetic disk drive 109, the magnetic tape drive 115, the FD 116, the CRT 117, the pattern monitor 118, or the printer 119. Alternatively, it may be output to the outside of the apparatus.

In the average ΔCD (ΔCDav) A map generation step (S140), the ΔCD map generation circuit 142 loads a reference average ΔCD (ΔCDavA) of each frame region from the memory 82, and generates an average ΔCD (ΔCDav) A map of the entire region of at least the right half of the inspection region, where each reference average ΔCD is a map value. The ΔCDavA map is output, for example, to the magnetic disk drive 109, the magnetic tape drive 115, the FD 116, the CRT 117, the pattern monitor 118, or the printer 119. Alternatively, it may be output to the outside of the apparatus.

In the average ΔCD (ΔCDav) B map generation step (S142), the ΔCD map generation circuit 142 loads an average ΔCD (ΔCDavB) of each frame region from the memory 84, and generates an average ΔCD (ΔCDav) B map of the entire region of at least the right half of the inspection region, where each average ΔCD is a map value. The ΔCDavB map is output, for example, to the magnetic disk drive 109, the magnetic tape drive 115, the FD 116, the CRT 117, the pattern monitor 118, or the printer 119. Alternatively, it may be output to the outside of the apparatus.

In the dimension difference map generation step (S144), the difference ΔCD map generation circuit 146 calculates, for each frame image (frame region), a critical dimension difference value by subtracting a reference average ΔCD (ΔCDavA) (the first critical dimension deviation amount) from an average ΔCD (ΔCDavB) (the second critical dimension deviation amount). Then, a dimension difference map of the entire region of at least the right half of the inspection region is generated, where each critical dimension difference value is a map value. Thereby, it is possible to eliminate the influence of ΔCD generated when generating a photo mask from reference design data. A dimension difference map is output, for example, to the magnetic disk drive 109, the magnetic tape drive 115, the FD 116, the CRT 117, the pattern monitor 118, or the printer 119. Alternatively, it may be output to the outside of the apparatus.

In the examples described above, a position shift pattern for positional deviation evaluation, where a positional deviation amount is variable, is defined in the left half of the inspection region 11, and a dimension shift pattern for CD deviation evaluation, where a CD deviation amount is variable, is defined in the right half. However, it in not limited to the examples described above. Right and left may be reversed, and it may be set as top and bottom. It is also preferable that a position shift pattern for positional deviation evaluation and a dimension shift pattern for CD deviation evaluation are arranged to be adjacent to each other and defined for the entire inspection region 11 without being unevenly distributed thereto. Alternatively, position shift patterns for positional deviation evaluation and respective dimension shift patterns for CD deviation evaluation may be defined all over the entire inspection region 11. It should be understood that each map is to be generated according to a position defined.

In the positional deviation sensitivity acquisition step (S150), a detectable positional deviation amount is acquired using a positional deviation amount A map (the first positional deviation amount) and a positional deviation amount B map (the second positional deviation amount). Alternatively, a detectable positional deviation amount is acquired using a positional deviation difference map (a positional deviation difference value). Specifically, a position shift amount is obtained such that a position shift amount that has been preset for each frame (or each inspection stripe) and a positional deviation difference value ((positional deviation amount B)−(positional deviation amount A)) in a corresponding frame region are in agreement with each other. Then, a minimum position shift amount "a", which satisfies the agreement, is acquired as a positional deviation sensitivity of the inspection apparatus 100. For example, there is a case where a positional deviation difference value is in agreement in a frame region in which the position shift amount is set to be 1.3 nm or greater and a positional deviation difference value is in disagreement in a frame region in which the position shift amount is set to be less than 1.3 nm. In such a case, the positional deviation sensitivity of the inspection apparatus 100 is 1.3 nm. Positional deviation sensitivities can be acquired with respect to the x-direction line pattern sensitivity, the y-direction line pattern sensitivity, the x-direction quadrangular pattern sensitivity, and the y-direction quadrangular pattern sensitivity.

In the ΔCD sensitivity acquisition step (S152), a detectable critical dimension deviation amount is acquired using a ΔCDavA map (the first critical dimension deviation amount) and a ΔCDavB map (the second critical dimension deviation amount). Alternatively, a detectable critical dimension deviation amount is acquired using a dimension difference map (a critical dimension difference value). Specifically, a dimension shift amount is obtained such that a dimension shift amount that has been preset for each frame (or each inspection stripe) and a critical dimension difference value (ΔCDavB−ΔCDavA) in a corresponding frame region are in agreement with each other. Then, a minimum dimension shift amount "b", which satisfies the agreement, is acquired as a ΔCD sensitivity of the inspection apparatus 100. For example, there is a case where a critical dimension difference value is in agreement in a frame region in which the dimension shift amount is set to be 1.3 nm or greater and a critical dimension difference value is in disagreement in a frame region in which the dimension shift amount is set to be less than 1.3 nm. In such a case, the ΔCD sensitivity of the inspection apparatus 100 is 1.3 nm. ΔCD sensitivities can be acquired with respect to the x-direction line pattern sensitivity, the y-direction line pattern sensitivity, the x-direction quadrangular pattern sensitivity, and the y-direction quadrangular pattern sensitivity.

As described above, according to the first embodiment, since evaluation pattern data in which positions and dimensions are shifted is generated not at the real mask side but the design data side, generation can be performed at required precision. Therefore, it is possible to evaluate an inspection sensitivity of CD deviation or positional deviation. Accordingly, it is possible to evaluate whether CD deviation or positional deviation at required precision can be inspected.

What are described as "circuits" or "steps" in the above description can be configured by hardware such as electronic circuits, or by computer operable programs. Alternatively, they may be implemented by not only programs being software but also combinations of hardware and software, or further, by combinations of hardware, software and firmware. When the "circuits" or "steps" are configured by programs, the programs are recorded on a computer readable recording medium, such as a magnetic disk drive, magnetic tape drive, FD, or ROM (Read Only Memory). For example, the table control circuit 114, the development circuit 111, the reference circuit 112, the comparison circuit 108, the positional deviation map (Pos map) generation circuit 140, the CD deviation (ΔCD) map generation circuit 142, the difference Pos map generation circuit 144, the difference ΔCD map generation circuit 146, and the like which constitute the operation control unit may be configured by electric circuits. Alternatively, they may be implemented as software to be processed by the control computer 110, or implemented by combinations of electric circuits and software.

Referring to specific examples, embodiments have been described above. However, the present invention is not limited to these examples. For example, the transmission illumination optical system which uses a transmitted light is described as an illumination optical system 170 in the embodiments, but it is not limited thereto. For example, it may be a reflection illumination optical system which uses a reflected light. Alternatively, it is also acceptable to simultaneously use a transmitted light and a reflected light by combining the transmission illumination optical system and the reflection illumination optical system.

Moreover, in the examples described above, as shown in FIG. 8, a positional deviation amount and a ΔCD are calculated using a frame image of the target object 101 and a design image of a frame region at the same position as that of the frame image, it is not limited thereto. As described above, since the target object 101 is based on reference design data in which position shifting and dimension shifting are not performed, it is also preferable to calculate a positional deviation amount of an image for each position shift amount by comparing a frame image of one frame region and a plurality of position shift design images. In that case, a reference positional deviation amount should be calculated using a reference design image corresponding to the frame region of the frame image used. Similarly, it is also preferable to calculate a ΔCD of an image for each dimension shift amount, or further calculate an average ΔCD (ΔCDavB) by comparing a frame image of one frame region and a plurality of dimension shift design images in which a dimensional deviation amount is variable. In that case, a reference ΔCD, or further a reference average ΔCD (ΔCDavA) should be calculated using a reference design image corresponding to the frame region of the frame image used.

While the apparatus configuration, control method, and the like not directly necessary for explaining the present invention are not described, some or all of them may be suitably selected and used when needed. For example, although description of the configuration of a control unit for controlling the inspection apparatus 100 is omitted, it should be understood that some or all of the configuration of the control unit is to be selected and used appropriately when necessary.

In addition, any other pattern inspection apparatus, pattern inspection method, and inspection sensitivity evaluation method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inspection sensitivity evaluation method comprising:
generating a reference design image in which a plurality of figure patterns are arranged, based on reference design data in which the plurality of figure patterns are defined;
generating a plurality of position shift design images whose positional deviation amounts are different from each other based on a plurality of preset positional deviation amounts in a manner such that positions of the plurality of figure patterns in the reference design image are uniformly shifted with respect to the plurality of figure patterns defined in the reference design data;
acquiring an optical image of a photo mask fabricated based on the reference design data where there is no positional deviation with respect to the plurality of figure patterns;
calculating a first positional deviation amount between the reference design image and the optical image;
calculating a plurality of second positional deviation amounts each of which is a respective positional deviation amount between a corresponding position shift design image of the plurality of position shift design images and the optical image; and
acquiring a detectable positional deviation amount by using the first positional deviation amount and the plurality of second positional deviation amounts.

2. The method according to claim 1, wherein,
in the reference design data, a respective plurality of figure patterns are defined in each of a plurality of regions whose positions are different from each other, and a plurality of reference design images corresponding to the plurality of regions are generated,
a respective plurality of position shift design images are generated as images in a corresponding region of the plurality of regions whose positions are different from each other, for each of the plurality of regions,
the photo mask is fabricated based on the reference design data in which the respective plurality of figure patterns are defined in the each of the plurality of regions,
a plurality of optical images corresponding to the plurality of regions are acquired,
a respective first positional deviation amount is calculated between each reference design image of the plurality of reference design images and a corresponding optical image of the plurality of optical images, for each of the plurality of regions, and
a respective plurality of second positional deviation amounts are calculated between each position shift design image of the respective plurality of position shift design images and a corresponding optical image of the plurality of optical images, for each of the plurality of regions.

3. The method according to claim 1, wherein an amount difference between the plurality of preset positional deviation amounts is difficult to produce in a real mask.

4. The method according to claim 1, wherein a difference of a positional deviation amount between the plurality of position shift design images is difficult to produce in a real mask.

5. The method according to claim 1, further comprising:
calculating a plurality of positional deviation difference values by respectively subtracting the first positional deviation amount from the plurality of second positional deviation amounts,
wherein the detectable positional deviation amount is a minimum positional deviation amount of at least one of the plurality of preset positional deviation amounts, and each of the at least one of the plurality of preset positional deviation amounts and a corresponding one of the plurality of positional deviation difference values are in agreement with each other.

6. The method according to claim 1, further comprising:
acquiring a stripe optical image for each of a plurality of stripe regions obtained by virtually dividing an inspection region of a photo mask into the plurality of stripe regions by a size of one side of a frame region of a plurality of frame regions; and
dividing the stripe optical image for the each of the plurality of stripe regions into a plurality of frame images by a size of another side of the frame region, each of the plurality of frame images being the optical image for a corresponding frame region of the plurality of frame regions.

7. An inspection sensitivity evaluation method comprising:
generating a reference design image in which a plurality of figure patterns are arranged, based on reference design data in which the plurality of figure patterns are defined;
generating a plurality of dimension shift design images whose critical dimension deviation amounts are different from each other based on a plurality of preset critical dimension deviation amounts in a manner such that critical dimensions of the plurality of figure patterns in the reference design image are uniformly shifted with respect to the plurality of figure patterns defined in the reference design data;
acquiring an optical image of a photo mask fabricated based on the reference design data where there is no critical dimension deviation with respect to the plurality of figure patterns;
calculating a first critical dimension deviation amount between the reference design image and the optical image;
calculating a plurality of second critical dimension deviation amounts each of which is a respective critical dimension deviation amount between a corresponding dimension shift design image of the plurality of dimension shift design images and the optical image; and
acquiring a detectable critical dimension deviation amount by using the first critical dimension deviation amount and the plurality of second critical dimension deviation amounts.

8. The method according to claim 7, wherein,
in the reference design data, a respective plurality of figure patterns are defined in each of a plurality of regions whose positions are different from each other, and a plurality of reference design images corresponding to the plurality of regions are generated,
a respective plurality of dimension shift design images are generated as images in a corresponding region of the plurality of regions whose positions are different from each other, for each of the plurality of regions,
the photo mask is fabricated based on the reference design data in which the respective plurality of figure patterns are defined in the each of the plurality of regions,
a plurality of optical images corresponding to the plurality of regions are acquired,
a respective first critical dimension deviation amount is calculated between each reference design image of the plurality of reference design images and a corresponding optical image of the plurality of optical images, for each of the plurality of regions, and
a respective plurality of second critical dimension deviation amounts are calculated between each dimension shift design image of the plurality of dimension shift design images and a corresponding optical image of the plurality of optical images, for each of the plurality of regions.

9. The method according to claim 7, wherein an amount difference between the plurality of preset critical dimension deviation amounts is difficult to produce in a real mask.

10. The method according to claim 7, wherein a difference of a critical dimension deviation amount between the plurality of dimension shift design images is difficult to produce in a real mask.

11. The method according to claim 7, further comprising:
calculating a plurality of critical dimension deviation difference values by respectively subtracting the first critical dimension deviation amount from the plurality of second critical dimension deviation amounts,
wherein the detectable critical dimension deviation amount is a minimum critical dimension deviation amount of at least one of the plurality of preset critical dimension deviation amounts, and each of the at least one of the plurality of preset critical dimension deviation amounts and a corresponding one of the plurality of critical dimension deviation difference values are in agreement with each other.

12. The method according to claim 7, further comprising:
acquiring a stripe optical image for each of a plurality of stripe regions obtained by virtually dividing an inspection region of a photo mask into the plurality of stripe regions by a size of one side of a frame region of a plurality of frame regions; and
dividing the stripe optical image for the each of the plurality of stripe regions into a plurality of frame images by a size of another side of the frame region, each of the plurality of frame images being the optical image for a corresponding frame region of the plurality of frame regions.

13. An inspection sensitivity evaluation method comprising:
generating a plurality of reference design images in which a respective plurality of figure patterns are arranged, based on reference design data in which the respective plurality of figure patterns are defined in a plurality of quadrangular regions whose positions are different from each other, to be corresponding to the plurality of quadrangular regions;
generating a respective plurality of position shift design images whose positional deviation amounts are different from each other based on a plurality of preset positional deviation amounts in a manner such that positions of the respective plurality of figure patterns in a corresponding reference design image of the plurality of reference design images are uniformly shifted with respect to the respective plurality of figure patterns defined in the reference design data, to be corresponding to each of the plurality of quadrangular regions whose positions are different from each other;
generating a respective plurality of dimension shift design images whose critical dimension deviation amounts are different from each other based on a plurality of preset critical dimension deviation amounts in a manner such that critical dimensions of the respective plurality of figure patterns in a corresponding reference design image of the plurality of reference design images are uniformly shifted with respect to the respective plurality of figure patterns defined in the reference design data, to be corresponding to the plurality of quadrangular regions whose positions are different from each other;
acquiring an optical image for each of a plurality of stripe regions obtained by virtually dividing an inspection region of a photo mask into a plurality of strip-shaped inspection regions by a size of one side of one of the plurality of quadrangular regions, wherein the photo mask is fabricated based on the reference design data in which the respective plurality of figure patterns are defined in the plurality of quadrangular regions;
dividing the optical image for the each of the plurality of stripe regions into a plurality of frame images by a size of another side of the one of the quadrangular regions;

calculating, for each frame image of the plurality of frame images, a first positional deviation amount between a frame image concerned and a corresponding reference design image by performing position alignment between the each frame image and a corresponding reference design image of the plurality of reference design images;

calculating, for the each frame image of the plurality of frame images, a plurality of second positional deviation amounts each of which is a respective positional deviation amount between a frame image concerned and a corresponding position shift design image by performing position alignment between the each frame image and a corresponding position shift design image of the plurality of position shift design images;

calculating, for the each frame image, a plurality of positional deviation difference values by respectively subtracting the first positional deviation amount from the plurality of second positional deviation amounts;

calculating, for the each frame image, a first critical dimension deviation amount between the each frame image of the plurality of frame images and a corresponding reference design image of the plurality of reference design images;

calculating, for the each frame image, a plurality of second critical dimension deviation amounts each of which is a respective critical dimension deviation amount between the each frame image of the plurality of frame images and a corresponding dimension shift design image of the plurality of dimension shift design images;

calculating, for the each frame image, a plurality of critical dimension difference values by respectively subtracting the first critical dimension deviation amount from the plurality of second critical dimension deviation amounts;

acquiring a detectable positional deviation amount by using the plurality of positional deviation difference values; and acquiring a detectable critical dimension deviation amount by using the plurality of critical dimension difference values.

14. The method according to claim 13, wherein, in the reference design data, a respective plurality of figure patterns are defined in each of a plurality of regions whose positions are different from each other, and a plurality of reference design images corresponding to the plurality of regions are generated, a respective plurality of position shift design images are generated as images in a corresponding region of the plurality of regions whose positions are different from each other, for each of the plurality of regions, the photo mask is fabricated based on the reference design data in which the respective plurality of figure patterns are defined in the each of the plurality of regions, a plurality of optical images corresponding to the plurality of regions are acquired, a respective first positional deviation amount is calculated between each reference design image of the plurality of reference design images and a corresponding optical image of the plurality of optical images, for each of the plurality of regions, and a respective plurality of second positional deviation amounts are calculated between each position shift design image of the plurality of position shift design images and a corresponding optical image of the plurality of optical images, for each of the plurality of regions.

15. The method according to claim 14, wherein a respective first critical dimension deviation amount is calculated between the each reference design image of the plurality of reference design images and a corresponding optical image of the plurality of optical images, for each of the plurality of regions, and a respective plurality of second critical dimension deviation amounts are calculated between each dimension shift design image of the plurality of dimension shift design images and a corresponding optical image of the plurality of optical images, for each of the plurality of regions.

* * * * *